(12) United States Patent
Chung et al.

(10) Patent No.: US 8,336,070 B2
(45) Date of Patent: *Dec. 18, 2012

(54) DIGITAL PHOTO FRAME WITH TELEVISION FUNCTION AND METHOD THEREOF

(75) Inventors: Shin-Hong Chung, Taipei Hsien (TW);
Li-Hua Hu, Shenzhen (CN);
Kuan-Hong Hsieh, Taipei Hsien (TW);
Zai-An Pan, Shenzhen (CN); Han-Che Wang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 996 days.

This patent is subject to a terminal disclaimer.

(21) Appl. No.: 12/329,618

(22) Filed: Dec. 7, 2008

(65) Prior Publication Data
US 2010/0033628 A1 Feb. 11, 2010

(30) Foreign Application Priority Data
Aug. 11, 2008 (CN) .......................... 2008 1 0303642

(51) Int. Cl.
*H04N 7/10* (2006.01)
*H04N 7/00* (2011.01)

(52) U.S. Cl. ......................................... 725/41; 348/552
(58) Field of Classification Search ................... 725/41; 348/552
See application file for complete search history.

(56) References Cited

U.S. PATENT DOCUMENTS
| | | | | |
|---|---|---|---|---|
| 6,020,930 | A * | 2/2000 | Legrand | 725/41 |
| 7,352,407 | B2 * | 4/2008 | Lan et al. | 348/569 |
| 7,386,871 | B1 * | 6/2008 | Knudson et al. | 725/92 |
| 2004/0244054 | A1 * | 12/2004 | Sheu et al. | 725/131 |

FOREIGN PATENT DOCUMENTS
| | | |
|---|---|---|
| CN | 1489379 A | 4/2004 |
| TW | I254577 | 5/2006 |

* cited by examiner

*Primary Examiner* — Pankaj Kumar
*Assistant Examiner* — Franklin Andramuno
(74) *Attorney, Agent, or Firm* — Altis Law Group, Inc.

(57) ABSTRACT

A method used in a digital photo frame (DPF) with television function is provided. The DPF has a DPF mode for playing multimedia files stored in a storage and a television (TV) mode for playing TV programs received by a TV receiving module. The method includes: fetching TV program information from a TV program schedule when the DPF is in the DPF mode; detecting whether at least one TV program is airing soon or currently aired at the current time; displaying a TV listing menu prompt containing information on the at least one "airing soon" or "currently aired" TV program; receiving a mode switching signal and changing the operational mode of the DPF to the TV mode; and receiving and playing one of the "airing soon" or "currently aired" TV programs.

19 Claims, 3 Drawing Sheets

DIGITAL PHOTO FRAME WITH TELEVISION FUNCTION AND METHOD THEREOF

FIELD OF THE INVENTION

The present invention relates to a digital photo frame (DPF) with television (TV) function, and especially relates to the DPF capable of prompting users to watch TV programs and facilitating broadcasting of the TV programs, and method thereof.

DESCRIPTION OF RELATED ART

Along with the rapid development in electronic technology, DPFs have become familiar to consumers. Some types of DPF have been designed to not only play image files, but also broadcast TV programs.

People get their favorite TV program schedule information mainly from entertainment sections in newspapers or from electronic program guides (EPGs). However, people may forget the broadcast times of their favorite TV programs and miss the favorite TV programs. At present, some types of DPFs are capable of broadcasting TV programs. However, these types of DPFs cannot prompt/remind one not to miss their favorite programs and cannot facilitate the broadcasting of the favorite programs.

BRIEF DESCRIPTION OF THE DRAWINGS

The components of the drawings are not necessarily drawn to scale, the emphasis instead being placed upon clearly illustrating the principles of a digital photo frame (DPF) with television (TV) function and method thereof. Moreover, in the drawings, like reference numerals designate corresponding parts throughout several views.

DETAILED DESCRIPTION OF THE EMBODIMENTS

Figure 1:
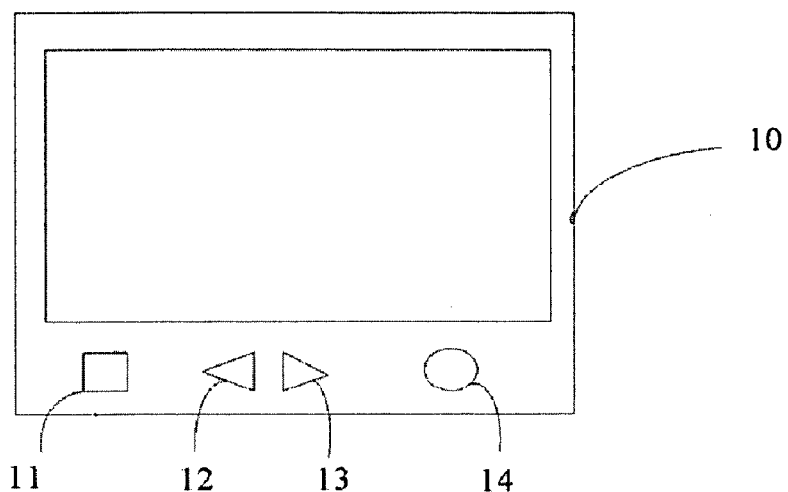
FIG. 1 is an isometric view of the DPF with TV function in accordance with an exemplary embodiment of the present invention.

FIG. 1 is an isometric view of a digital photo frame (DPF) 10 with television (TV) function in accordance with an exemplary embodiment of the present invention.

The DPF 10 mainly includes a power button 11, a previous button 12, a next button 13 and a switch button 14. The power button 11 is configured for powering on and powering off the DPF 10. The switch button 14 is configured for manually switching an operation mode of the DPF 10 between a DPF mode and a TV mode. When the DPF 10 is in the DPF mode, the previous button 12 and the next button 13 are configured for selecting image files for the DPF 10 to reproduce. When the DPF 10 is in the TV mode, the previous button 12 and the next button 13 are configured for changing TV channels.

Figure 2:
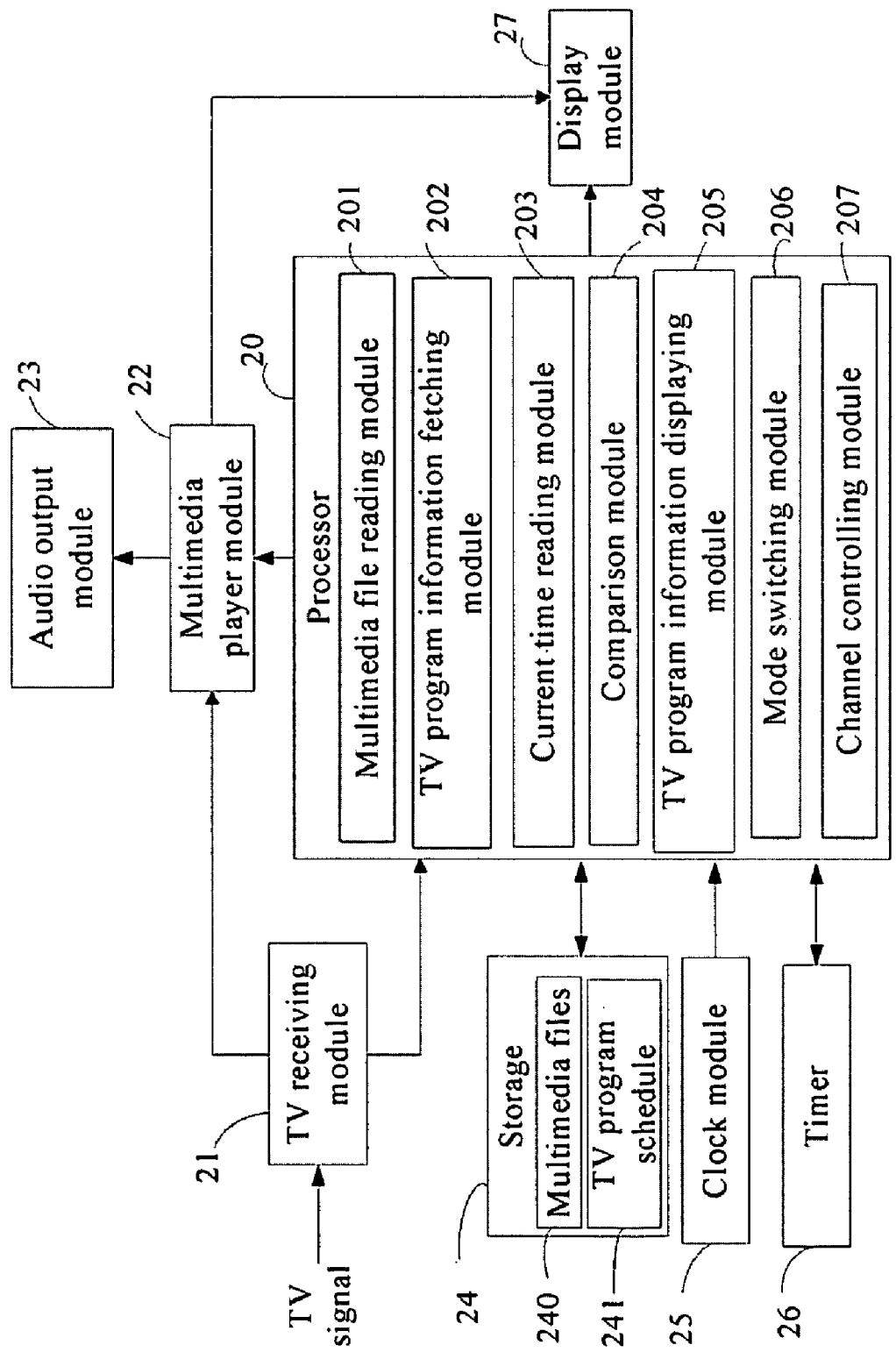
FIG. 2 is a block diagram of the DPF of FIG. 1 in accordance with an exemplary embodiment of the present invention.

FIG. 2 is a block diagram of the DPF 10 in accordance with an exemplary embodiment of the present invention.

The DPF 10 includes a processor 20 connected to a TV receiving module 21, a multimedia player module 22, a storage 24, and a display module 27, which are controllable by the processor 20.

The storage 24 is configured for storing multimedia files 240. The multimedia files 240 may include image files, video files, audio files, and so on. When the DPF 10 is in the DPF mode, the processor 20 fetches the multimedia files 240 from the storage 24 and transfers the multimedia files 240 to the multimedia player module 22. The multimedia player module 22 then reproduces image/audio data of the multimedia files 240 on the display module 27. When the DPF 10 is in the TV mode, the TV receiving module 21 is controlled by the processor 20 to receive TV programs and transfers the TV programs to the multimedia player module 22. The multimedia player module 22 then reproduces image/audio data of the TV programs on the display module 27. The multimedia player module 22 is connected to an audio output module 23 (e.g., a speaker) and the display module 27. The audio output module 23 is configured for outputting the audio data of the multimedia files 240 and the TV programs.

The storage 24 is further configured for storing at least a TV program schedule 241. The TV program schedule 241 can be inputted manually or can be an electronic program guide (EPG) downloaded from the Internet. The TV program schedule 241 records information on one or more TV programs. The information of each TV program includes a program title, a broadcast time, and a TV station logo. The broadcast time in one exemplary embodiment includes a start time and an end time of each of the TV programs. The broadcast time in another exemplary embodiment includes the start time and a program time length of each of the TV programs. The TV station logos can be names or channel numbers of TV stations. If the TV station logo is the name of a TV station, the name is preset to correspond to a channel parameter (e.g., channel frequency) of the TV station, the channel parameter enables the DPF 10 to receive TV programs from the TV station according to the name of the TV station recorded in the TV program schedule 241.

The DPF 10 also includes a clock module 25 configured for providing a current time.

The DPF 10 also includes a timer 26. The timer 26 can be in a default setting or a user defined setting. The timer 26 can be either a count-up timer or a count-down timer.

The processor 20 includes a multimedia file reading module 201, a TV program information fetching module 202, a current time reading module 203, a comparison module 204, a TV program information displaying module 205, a mode switching module 206, and a channel controlling module 207.

The multimedia file reading module 201 is configured for fetching the multimedia files 240 from the storage 24. The TV program information fetching module 202 is configured for fetching the TV program information from the TV program schedule 241 stored in the storage 24. The current time reading module 203 is configured for reading the current time from the clock module 25. The comparison module 204 is configured for finding/detecting at least one showing TV program according to the TV program information and the current time. The showing TV program may be the TV program that is airing soon or the TV program that is currently aired. The TV program information displaying module 205 is configured for generating and displaying a TV listing menu prompt on the display module 27 via the multimedia player module 22. The TV listing menu prompt consists of information on at least one showing TV program. The mode switching module 206 is configured for switching the operational mode between the DPF mode and the TV mode. The channel controlling module 207 is configured for controlling the TV receiving module 21 to receive TV programs of a selected TV channel.

Generally, according to an exemplary embodiment, if the comparison module 204 finds at least one showing TV program, the TV program information displaying module 205 generates and displays the TV listing menu prompt on the display module 27 via the multimedia player module 22. The TV listing menu prompt is displayed for duration correspondingly to a menu display time. In the menu display time of the TV listing menu prompt, if receiving a mode switching signal transmitted from the switch button 14, the mode switching module 206 changes the operation mode of the DPF 10 from the DPF mode to the TV mode, and the channel controlling module 207 controls the TV receiving module 21 to receive the selected showing TV program on the TV listing menu prompt.

Figure 3:
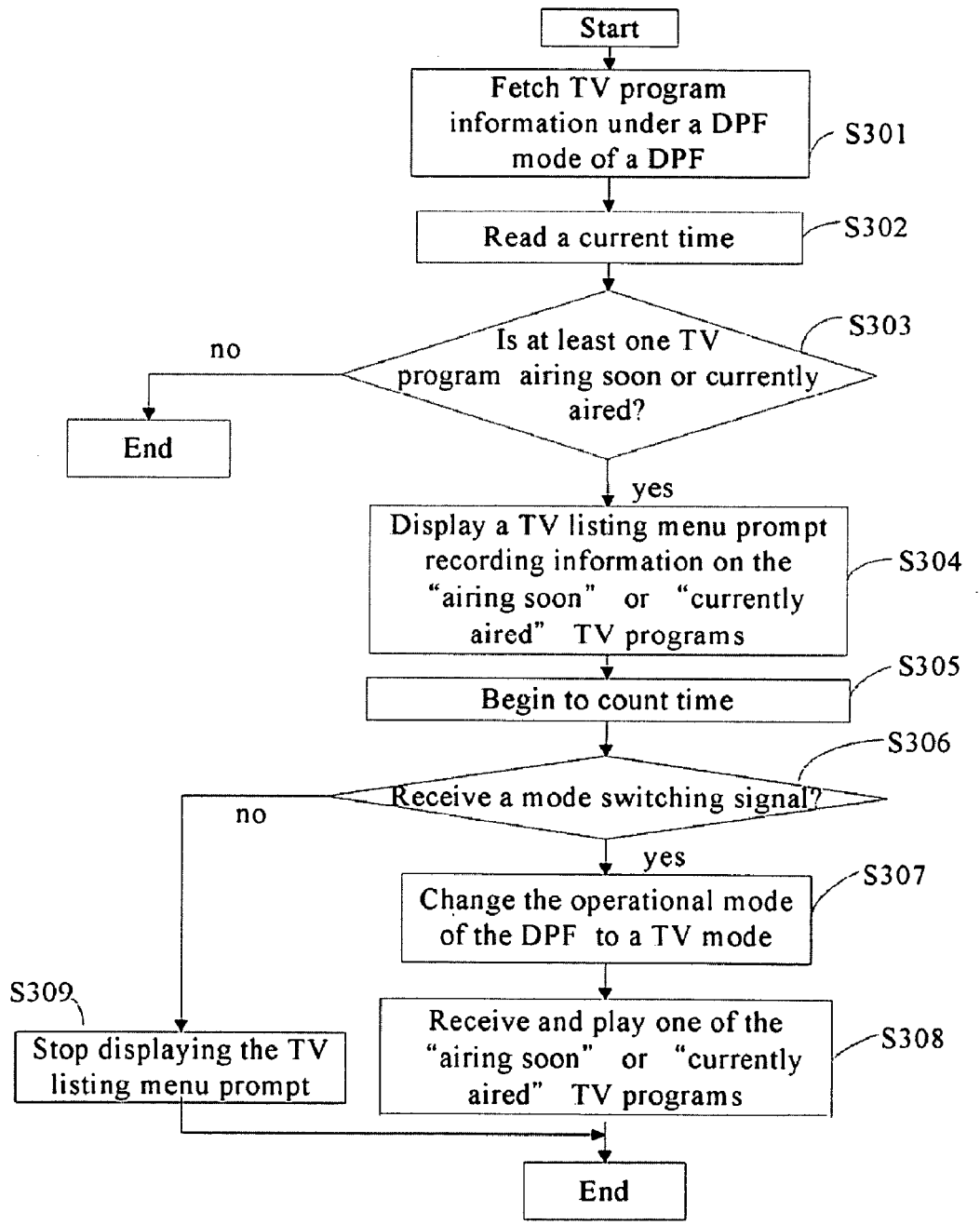
FIG. 3 is a flowchart of the DPF of FIG. 1 invoking a TV listing menu prompt in accordance with an exemplary embodiment of the present invention.

FIG. 3 is a flowchart of the DPF 10 invoking the TV listing menu prompt in accordance with an exemplary embodiment of the present invention.

In step S301, under the DPF mode, the TV program information fetching module 202 fetches the TV program information from the TV program schedule 241 stored in the storage 24 periodically.

In step S302, the current time reading module 203 reads the current time from the clock module 25.

In step S303, the comparison module 204 searches for at least one showing TV program. If no showing TV program can be found, the whole procedure is over. If at least one showing TV program is found, the procedure goes to step S304 described below.

Generally, according to an exemplary embodiment, if the current time is within a predetermined time interval away from the start time of an exemplary TV program, or, if the current time is within an airing time of the exemplary TV program, the exemplary TV program would be the showing TV program.

In step S304, The TV program information displaying module 205 generates and displays the TV listing menu prompt on the display module 27 via the multimedia player module 22.

The TV listing menu prompt consists of information on at least one showing TV program. The information includes the program title, the start time and the TV station logo of each of the showing TV program. In other embodiment, the information may also include the end time or the program time length of each of the showing TV program.

The TV program information displaying module 205 can sort the showing TV programs on the TV listing menu prompt in a predetermined order. In one embodiment, the showing TV programs can be sorted according to the start times of the showing TV programs. In an alternative embodiment, the showing TV programs can be sorted according to preference. In another alternative embodiment, the showing TV programs can be sorted according to the time intervals between start times of the showing TV programs and the current time.

The TV listing menu prompt may take up the full screen of the display module 27 or may be displayed in a predetermined area of the display module 27. Furthermore, in an exemplary embodiment, the TV listing menu prompt can be displayed as a static text. A cursor firstly points to the showing TV program placed on the top of the TV listing menu prompt, and then can be moved to point to another showing TV program by the users using the previous button 12 and the next button 13. The showing TV program the cursor points to can be selected to broadcast if the users transmit a mode switching signal to the mode switching module 206. In an alternative embodiment, the TV listing menu prompt is rolled on the screen of the display module 27, and the showing TV programs on the TV listing menu prompt are displayed one after another. A showing TV program can be selected to broadcast if the mode switching module 206 receives the mode switching signal when information of the showing TV program is displayed on the screen of the display module 27.

In step S305, the timer 26 begins to measure time to control the menu display time of the TV listing menu prompt.

In step S306, the mode switching module 206 determines whether a mode switching signal is received within the menu display time of the TV listing menu prompt. If the mode switching module 206 receives the mode switching signal transmitted from the switching button 14 within the menu display time of the TV listing menu prompt, the procedure goes to step S307 described below, otherwise the procedure goes to step S309 described below.

In step S307, the mode switching module 206 changes the operational mode of the DPF 10 to the TV mode.

In step S308, the channel controlling module 207 controls the TV receiving module 21 to receive the selected showing TV program, whereupon the whole procedure is over.

In step S309, if the mode switching module 206 doesn't receive any mode switching signal within the menu display time of the TV listing menu prompt, the TV program information displaying module 204 stops displaying the TV listing menu prompt on the display module 27 via the multimedia player module 22, whereupon the whole procedure is over.

Although the present invention has been specifically described on the basis of preferred embodiments and method thereof, the invention is not to be construed as being limited thereto. Various changes or modifications may be made to the embodiments without departing from the scope and spirit of the invention.

What is claimed is:

1. A digital photo frame (DPF) with television (TV) function and capable of switching between a DPF mode and a television (TV) mode, comprising:
   a display module;
   a TV receiving module configured for receiving TV programs;
   a storage configured for storing at least one TV program schedule containing information on one or more TV programs, the information comprises a program title, a broadcast time and a TV station logo of each of the TV programs;
   a clock module configured for providing a current time; and
   a processor comprising:
      a TV program information fetching module configured for fetching the TV program information from the TV program schedule stored in the storage;
      a current time reading module configured for reading the current time from the clock module;
      a comparison module configured for detecting at least one showing TV program according to the TV program information and the current time, wherein the showing TV program is the TV program that is airing soon or the TV program that is currently aired;
      a TV program information displaying module configured for generating and displaying a TV listing menu prompt on the display module of the DPF when at least one showing TV program is found, wherein the TV listing menu prompt containing information on the at least one showing TV program;
      a switching module configured for changing the operational mode of the DPF to the TV mode when receiving a mode switching signal transmitted from input within a menu display time of the TV listing menu prompt; and a channel controlling module configured for controlling the TV receiving module to receive one of the showing TV programs.

2. The DPF as described in claim 1, wherein the TV listing menu prompt is rolled on screen of the display module, and the showing TV programs recorded on the TV listing menu prompt are displayed one after another.

3. The DPF as described in claim 1, wherein the TV listing menu prompt takes up the full screen of the display module.

4. The DPF as described in claim 1, further comprising a previous button and a next button configured for selecting one of the showing TV programs on the TV listing menu prompt, the channel controlling module is configured for controlling the TV receiving module to receive the selected showing TV program when the mode switching module changes the operational mode of the DPF to the TV mode upon receiving the mode switching signal within the menu display time of the TV listing menu prompt.

5. The DPF as described in claim 2, wherein the channel controlling module is configured for controlling the TV receiving module to receive the showing TV program whose information is displayed on the screen of the display module when the mode switching module changes the operational mode of the DPF to the TV mode upon receiving the mode switching signal within the menu display time of the TV listing menu prompt.

6. The DPF as described in claim 1 wherein the broadcast time comprises a start time and an end time of each of the TV programs.

7. The DPF as described in claim 1, wherein the broadcast time comprises a start time and a program time length of each of the TV programs.

8. The DPF as described in claim 1, wherein the broadcast time comprises a start time of each of the TV programs, the storage is further configured for storing at least one predetermined time interval, the comparison module is further configured for detecting at least one showing TV program according to the start time of each of the TV programs and the predetermined time interval.

9. The DPF as described in claim 1, wherein the TV program information displaying module is further configured for sorting the showing TV program on the TV listing menu prompt according to preference.

10. The DPF as described in claim 1, wherein the broadcast time comprises a start time of each of the TV programs, and the TV program information displaying module is further configured for sorting the showing TV programs on the TV listing menu prompt according to the start time of each of the TV programs.

11. The DPF as described in claim 1, wherein the broadcast time comprises a start time of each of the TV programs, and the TV program information displaying module is further configured for sorting the showing TV programs on the TV listing menu prompt according to the time interval between the start time of each of the TV programs and the current time.

12. The DPF as described in claim 1, further comprising a timer configured for controlling the menu display time of displaying the TV listing menu prompt.

13. A method of a digital photo frame (DPF) with television (TV) function and capable of switching between a DPF mode and a television (TV) mode, the method comprising:

fetching TV program information from a pre-stored TV program schedule when the DPF is in the DPF mode, wherein the information recorded on the TV program schedule contains a program title, a broadcast time and a TV station logos of each of the TV programs;

reading a current time;

detecting at least one showing TV program according to the TV program information and the current time, wherein the showing TV programs is the TV program that is airing soon or the TV program that is currently aired;

displaying a TV listing menu prompt within a menu display time when at least one showing TV programs is found, wherein the TV listing menu prompt containing information on the at least one showing TV program;

determining whether a mode switching signal within the menu display time of the TV listing menu prompt is received;

changing the operational mode of the DPF to the TV mode when the mode switching signal within the menu display time of the TV listing menu prompt is received; and receiving and playing one of the showing TV programs.

14. The method as described in claim 13, further comprising:

selecting a showing TV program on the TV listing menu prompt before changing the operational mode of the DPF to the TV mode and playing the selected showing TV program.

15. The method as described in claim 13, wherein displaying the TV listing menu prompt comprising rolling the TV listing menu prompt, and displaying the showing TV programs recorded on the TV listing menu prompt one after another.

16. The method as described in claim 15, wherein the showing TV program selected to play is the one whose information is displayed when the mode switching signal is received.

17. The method as described in claim 13, wherein the broadcast time comprises a start time of each of the TV programs, and the showing TV programs are sorted according to the start time of each of the TV programs on the TV listing menu prompt.

18. The method as described in claim 13, wherein the broadcast time comprises a start time of each of the TV programs, and the showing TV programs are sorted according to the time interval between the start time of each of the TV programs and the current time on the TV listing menu prompt.

19. The method as described in claim 13, wherein the showing TV programs on the TV listing menu prompt are sorted according to preference.

* * * * *